(12) United States Patent
Abegglen et al.

(10) Patent No.: US 9,573,753 B2
(45) Date of Patent: Feb. 21, 2017

(54) CAPSULE AND METHOD FOR THE PREPARATION OF A BEVERAGE BY CENTRIFUGATION

(75) Inventors: Daniel Abegglen, Rances (CH); Jean-Francois Tinembart, Yverdon (CH); Alexandre Perentes, Lausanne (CH); Arnaud Gerbaulet, Oye et Pallet (FR)

(73) Assignee: Nestec S.A., Vevey (CH)

( * ) Notice: Subject to any disclaimer, the term of this patent is extended or adjusted under 35 U.S.C. 154(b) by 741 days.

(21) Appl. No.: 13/980,781

(22) PCT Filed: Jan. 10, 2012

(86) PCT No.: PCT/EP2012/050271
§ 371 (c)(1),
(2), (4) Date: Jul. 19, 2013

(87) PCT Pub. No.: WO2012/100976
PCT Pub. Date: Aug. 2, 2012

(65) Prior Publication Data
US 2013/0302476 A1    Nov. 14, 2013

(30) Foreign Application Priority Data
Jan. 24, 2011    (EP) .................................... 11151853

(51) Int. Cl.
B65D 85/804    (2006.01)
A47J 31/22    (2006.01)
B65D 65/46    (2006.01)

(52) U.S. Cl.
CPC ............ B65D 85/8043 (2013.01); A47J 31/22 (2013.01); B65D 65/466 (2013.01)

(58) Field of Classification Search
CPC ..... B65D 85/8043; B65D 65/466; A47J 31/22
See application file for complete search history.

(56) References Cited

U.S. PATENT DOCUMENTS 5,243,164 A * 9/1993 Erickson ................. A47J 31/02
219/689
2010/0064899 A1   3/2010 Aardenburg

FOREIGN PATENT DOCUMENTS

CN    1922096    2/2007
EP    2119383    11/2009
(Continued)

Primary Examiner — Erik Kashnikow
Assistant Examiner — Chaim Smith
(74) Attorney, Agent, or Firm — K&L Gates LLP (57) ABSTRACT

Capsule (1) designed in particular for preparing a beverage by centrifugation of a capsule in a centrifugal preparation device, comprising:—a body (2) comprising a containment wall delimiting a main cavity (6) of central axis (I) and,—a lid (7) associated to the body for delimiting a compartment containing beverage ingredients; said capsule further comprising at least one breakable outlet area positioned at the body and/or lid; said at least one breakable area being positioned at a distance from the central axis (I) and being obtained by any of means (a) to (d): e) A breakable and dedicated membrane (9, 16) covering a predefined opening (8, 15) in the containment wall or lid and connected to the wall or lid, f) A dedicated membrane covering a predefined opening in the containment wall or lid and connected to the wall or lid by a breakable sealing joint or, g) A dedicated, breakable and localized reduction of thickness of the material of the containment wall or lid, h) Any possible combinations of a), b) or c).

9 Claims, 7 Drawing Sheets

(56) References Cited

FOREIGN PATENT DOCUMENTS

| EP | 2133285 | 12/2009 |
|----|---------|---------|
| WO | 2008148834 | 12/2008 |
| WO | 2009130311 | 10/2009 |
| WO | 2010026053 | 3/2010 |
| WO | 2010041179 | 4/2010 |

\* cited by examiner

CAPSULE AND METHOD FOR THE PREPARATION OF A BEVERAGE BY CENTRIFUGATION

CROSS REFERENCE TO RELATED APPLICATIONS

The present application is a National Stage of International Application No. PCT/EP2012/050271, filed on Jan. 10, 2012, which claims priority to European Patent Application No. 11151853.6, filed Jan. 24, 2011, the entire contents of which are being incorporated herein by reference.

FIELD OF THE INVENTION

The present invention relates to the field of portioned beverage using capsules for preparing a beverage in a beverage brewing device. The invention more particularly relates to an improved capsule and a method for preparing the beverage.

BACKGROUND ART

The preparation of a beverage by a capsule containing beverage ingredients is known. In general, the capsule is inserted in a beverage production device, such as a coffee machine, liquid is fed in the capsule, the liquid interacts with the beverage ingredients and a beverage is extracted from the capsule under pressure or by gravity.

The preparation of a beverage by using the centrifugation is known. The principle mainly consists in providing beverage ingredients in a container of the capsule, feeding liquid in the receptacle and rotating the receptacle at elevated speed to ensure the interaction of liquid with ingredients while creating a gradient of pressure of liquid in the receptacle; such pressure increasing gradually from the centre towards the periphery of the receptacle. As liquid traverses the ingredients, e.g., ground coffee, extraction of the food compounds takes place and a liquid extract is obtained that flows out at the periphery of the receptacle.

The term "capsule" refers to any flexible, rigid or semi-rigid packaging container containing beverage ingredients. Other synonyms to a capsule are: "pod", "pad", "cartridge" or "sachet". The capsule can be designed for a single use. The container can also be filled with ingredients by the user to form the capsule just before use.

The term "ingredients" means any suitable beverage substance such as ground coffee, soluble coffee, leaf tea, soluble tea, herbal tea, dairy powder, culinary powder, baby food, other beverage nutritional ingredients and any combinations thereof.

A capsule system and method for preparing a beverage from a capsule using centrifugation forces is described in the following documents: EP2210539, WO2008/148604, WO2008148650, WO2008/148646, WO2008/148656 and WO2010/026045.

It is known to use a capsule in a beverage brewing device using centrifugation wherein a closing wall of the capsule is removed or perforated for enabling insertion of beverage extracting means.

EP2119383A1 relates to a portion capsule which can be inserted into a rotary brewing device. The portion capsule has a casing, a lid and a base. The casing can be provided with openings or perforations. The openings may be covered by a cover on the openings which is removed by the user before inserting the capsule into the device. The perforations can be provided in the casing by a number of perforation needles which are generally displaced radially with respect to the rotation axis of the device towards the rotation axis.

In WO 2008/148834, a capsule is proposed with pre-made outlets at its periphery; the outlets being covered by a gastight sealing membrane. The sealing membrane can be a flexible band surrounding the wall and which can be pierced, cut or removed by the user for uncovering the outlets before the capsule is inserted in the centrifugal brewing device. However, due to the monolithic arrangement of the sealing membrane, the opening of the membrane cannot be properly controlled without dedicated perforating members properly positioned in the brewing device. Another proposed capsule comprises an upper wall, a lower wall and a peripheral sealing edge which is designed to open as a result of the pressure of liquid which applies against it. The problem is to control the opening of the sealing edge by effect of the pressure of liquid thereon while ensuring a proper closure of the capsule at the sealing edge before opening (e.g. during storage, transport, etc.). This is relatively difficult to ensure in practice because the opening resistance of the closure to provide a proper bond of the elements of the capsule and/or avoid spillage of the ingredients during handling or storage may not be adapted for an opening under the conditions of pressure of the centrifuged beverage.

WO 2010/026053 relates to a single-use capsule which contains portioned food ingredients which can be sealed in a gastight manner with a perforable sealing membrane. The capsule experiences the same disadvantage as the capsule of WO 2008/148834.

The present invention aims at proposing a simpler, easier and more reliable solution for facilitating the opening of a capsule to allow the beverage release, by the effect of the centrifugal forces exerted by the beverage.

SUMMARY OF THE INVENTION

The invention provides a solution to such objectives as well as possible additional advantages.

For this the capsule of the invention is defined by the claim 1. The dependent claims further define the invention in more detail.

The capsule is designed in particular for preparing a beverage by centrifugation in a centrifugal preparation device, comprising:
  a body comprising a containment wall delimiting a main cavity of central axis (I) and,
  a lid associated to the body for delimiting a compartment containing beverage ingredients; said capsule further comprising a plurality of breakable outlet areas positioned at the body and/or lid; said breakable outlet areas being positioned at a distance from the central axis (I) and being obtained by any of means (a) to (d):
    a) A breakable and dedicated membrane covering predefined openings in the containment wall or lid and connected to the wall or lid,
    b) A dedicated membrane covering predefined openings in the containment wall or lid and connected to the wall or lid by a breakable sealing joint or,
    c) A dedicated, breakable and localized reduction of thickness of the material of the containment wall or lid in said breakable outlet areas,
    d) Any possible combinations of a), b) or c).

Preferably, the breakable areas are positioned at a distance which is at least in the last half, preferably in the last third, most preferably in the last quarter of the maximal radius of the capsule. Hence, the breakable areas are placed in the area where the centrifugal force is (or nearly) the highest. Preferably, no breakable area is positioned outside this last portion of the maximal radius. Hence, this ensures that the liquid leaving the capsule does not by-pass the mass of ingredients Therefore, the said dedicated membrane or its sealing joint, or said dedicated localized reduction of thickness are selectively configured to break by the pressure of the centrifuged beverage applied thereon and/or by the contact with the centrifuged beverage in the capsule softening, melting and/or dissolving the breakable outlet areas, to form at least one liquid outlet through which the centrifuged beverage can leave the capsule. In particular, the need for providing dedicated perforating members in the brewing device is removed.

The reduced tear resistance of the breakable areas is to be compared to the tear resistance of the body and/or lid neighboring the breakable areas. The areas of reduced tear resistance provide a region that is prone to the rupture and forms a flow passage upon the application of the pressure of the centrifugal beverage at the internal periphery of the body and/or lid.

Therefore, contrary to the known prior art, the proposed solution with a dedicated membrane, a breakable sealing joint, a localized reduction of thickness, or combinations thereof, provided in a wall of the capsule enables to more easily control the opening, such as by pressure of the beverage, of the beverage outlet(s) of the capsule. As a result, the time of the liquid in contact with the beverage ingredients can be more accurately mastered and tailored so the quality of the beverage, e.g., coffee extract. This solution is essentially independent of the sealing of the main containment walls of the capsule. Therefore, the capsule is generally easier to produce and the opening is more easily controlled by the dedicated opening means. In particular, the element (e.g., body or lid) of the capsule including the dedicated breakable area can be produced independently from the other elements (e.g., lid or body) of the capsule.

More particularly, the capsule comprises a plurality of breakable areas distributed circumferentially at the periphery of the capsule; the areas consisting of:
  a) predefined openings spaced apart in the containment wall of the body or lid covered by a membrane connected to said wall or lid by a sealing joint, wherein the membrane and/or the joint is breakable or,
  b) a plurality of dedicated pre-weakened points or lines spaced apart on the containment wall or lid.

In a mode, the plurality of breakable areas is formed on the body, in particular, on a larger section of the containment wall and below an outwardly protruding flange of the capsule. The larger section of the containment wall is preferably an upwardly widening annular part of the cup-shaped containment wall of the body.

The membrane can be formed of aluminium and/or polymer such as PE, PET, PP, PA, PLA, metalized biodegradable polymer(s) such as a foil comprising polyhydroxybutyrate-metal-cellophane and combinations thereof.

The membrane or foil may have a thickness comprised between 5 and 100 microns, preferably between 10 and 50 microns.

The membrane may be a plain membrane or may have a line of weakness to promote tearing of the membrane in a predetermined area.

The breakable area, such as the membrane, can be made of a material that softens, melts or dissolves by contact with a liquid at a temperature between 80 and 100° C. As a result the breakable area, e.g., membrane, breaks as a result of the combined effect of the centrifugal pressure and the contact with the hot liquid.

In another mode, the plurality of breakable areas is formed on the lid, in particular, close to the periphery of the lid and before an outwardly protruding flange of the capsule. Preferably, the breakable areas, such as the membrane and/or sealing joint of the membrane covering the pre-defined openings or pre-weakened points or lines are distanced from the flange of the capsule of a distance comprised between 0 and 12 mm, preferably 0.1 and 10 mm.

Preferably, the plurality of predefined openings or pre-weakened points or lines are all positioned at a distance which is at least in the last third, most preferably in the last quarter of the maximal radius of the capsule. Preferably, no openings or pre-weakened points or lines is/are positioned outside this last portion of the maximal radius. Hence, this ensures that the liquid leaving the capsule does not by-pass the mass of ingredients In all the different mode, a filter is associated with the breakable area(s). For instance, the area(s) is (are) covered by the filter. The filter may be placed adjacent the said area or distanced from the area.

The filter may be made of a material chosen amongst a woven or non-woven polymer, cellulose (e.g., filter paper), natural fibers and combinations thereof.

The present invention further relates to a method for preparing a beverage by centrifugation of a capsule, as defined before, in a centrifugal preparation device by:
  feeding liquid in the compartment and driving the capsule in rotation around said axis (I) for enabling the liquid to interact with the beverage ingredients to produce a beverage; said beverage applying a pressure on the at least one breakable outlet area which causes the outlet area to break and form at least one liquid outlet through which the centrifuged beverage leaves the capsule.

According to the method of the invention, the breakable outlet area breaks under any one or a combined effect of a mechanical breaking by the pressure of beverage, a softening, or melting of the material by heat of the beverage and/or a softening or dissolution by contact with liquid of the material.

The capsule is preferably driven in rotation at a speed or within a speed range to cause breakage of the outlet area(s) comprised between 1000 and 10000 rpm, preferably 2500 and 8000 rpm. The corresponding pressure of liquid obtained on the breakable area may be comprised between about 0.5 and 3 bar.

BRIEF DESCRIPTION OF THE DRAWINGS

Additional features of the invention will appear in the detailed description of the figures which follows.

DETAILED DESCRIPTION OF THE FIGURES

A first mode of the capsule is illustrated in FIGS. 1 to 4. The capsule 1 according to this first mode comprises a body 2 having containment walls, namely, a bottom 3 and a sidewall 4. The body can be generally cup-shaped. A peripheral flange 5 extends outwardly from the upper portion of the sidewall 4. A cavity 6 is defined by the inner edge of the flange and extends along a central axis "I". However, the cross section of the cavity is not necessarily limited to circular contour and can be oval or polygonal depending on the shape of the containment walls. Therefore, the flange forms an annular border surrounding the cavity. The body thereby forms a cavity 6 of central axis "I" for receiving beverage ingredients such as a metered amount of ground coffee. The cavity is closed by a lid 7 which may be sealed on the flange 5. For instance, the lid has a U-shape comprising a main lowered part and an annular border which is sealed to the inner surface of the sidewall of the body. The border may be a simple upward extension or an upward and outward extension connected to the flange. Of course, many other structural variations of the lid and body are possible.

In this first embodiment, a series of breakable outlet areas is provided. These areas are distributed on the periphery of the sidewall 4, preferably, in the vicinity of the flange 5, where the wall 4 widens. It should be noted that the outlet areas are all positioned in the last quarter, even more preferably in the last ⅛ portion, of the maximal radius "R" of the capsule. Such radius "R" is measured between the axis "I" and the most distant point of the capsule, e.g., the most distant point of the flange from the central axis "I". The areas are formed by a series of pre-made openings 8, also distributed peripherally in the wall 4. A breakable membrane 9 is placed internally to cover each of the said openings. The membrane can be sealed onto the inner surface of the sidewall by any suitable adhesive. The membrane can be gastight. A single membrane in the form of a ribbon may be adhesively connected for covering several, preferably all the openings 8. It is also possible to have several membranes covering different openings (e.g., one membrane per opening). On the opposite surface of the sidewall, a filter 10 is also adhesively connected. The filter may also be formed of a ribbon covering several, preferably all the openings. The filter is configured to provide a low pressure drop, to prevent any risk of being accidentally torn by the centrifuged liquid.

In general (for all embodiments), the filter is designed to provide a much lower pressure loss than the pressure loss of the membrane or other breakable means. For this, the filter is preferably a paper filter or a woven or non woven fabric made of natural and/or synthetic fibres or combinations thereof. The pore size of the filter may be comprised between about 10 and 250 microns, preferably comprised between 50 to 150 microns. The filter may have a thickness comprised between about 100 microns and 3 mm depending on the material and pore size.

Of course, several membranes and/or filters can be sized to cover the openings individually.

The membrane can also be formed by co-injection or co-lamination with the wall.

It should be noted that the membrane(s) may include one or more lines of weakness to promote the tearing of the membrane(s) in a predetermined area or areas. A line of weakness is typically a removal of a part of the thickness of the membrane or a deformation such as by a stamp to reduce the tear resistance of the membrane along a defined line or contour.

The opening may be formed by moulding, die-stamping or removing of all or part of the thickness of the wall in the surface area of the opening(s). Such removal may be obtained by laser or mechanical scoring or chemical etching.

Figure 1:
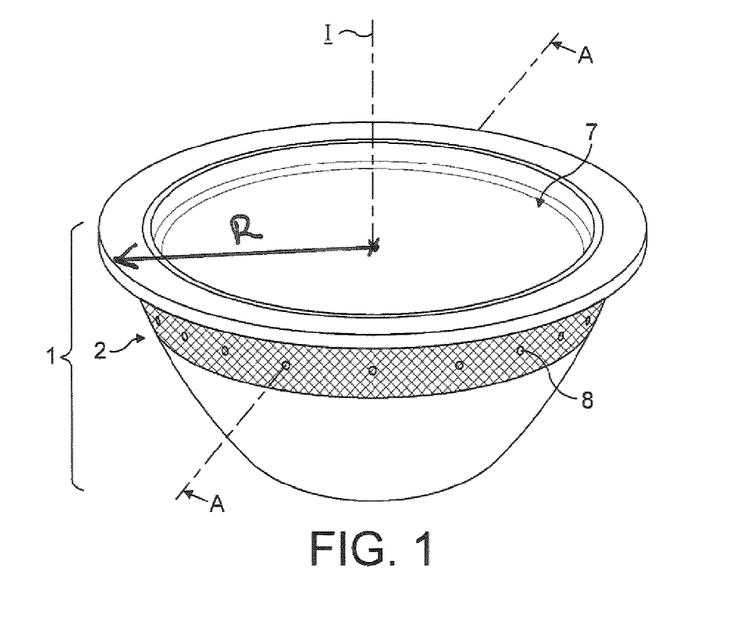
FIG. 1 shows in perspective view a capsule according to a first embodiment of the invention.
Figure 2:
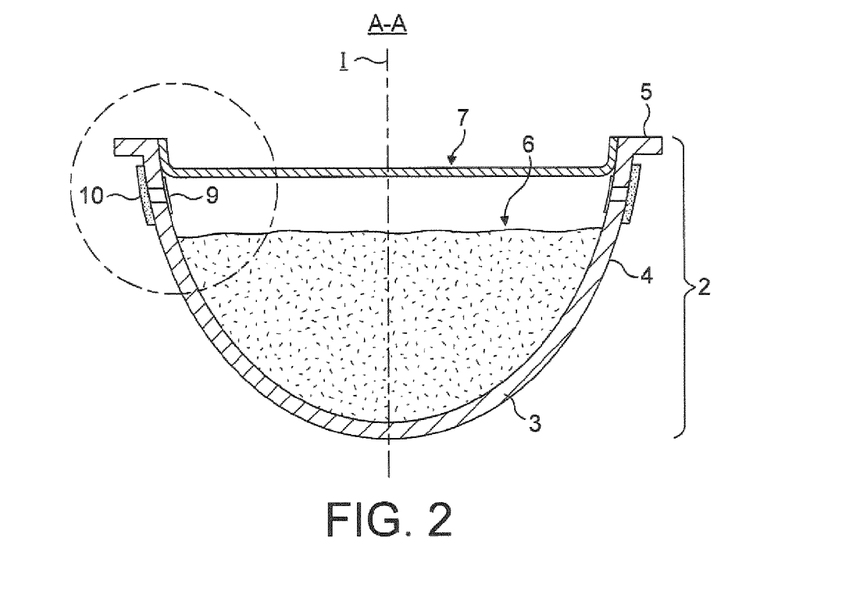
FIG. 2 shows a cross-section view along plane A-A of the capsule of FIG. 1.
Figure 3:
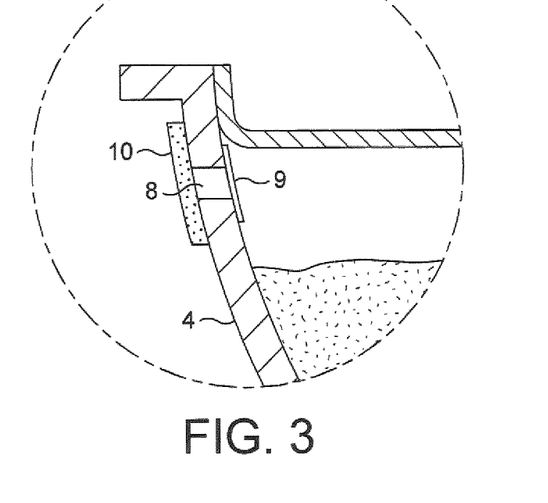
FIG. 3 shows a detail of the capsule of FIG. 2.
Figure 4:
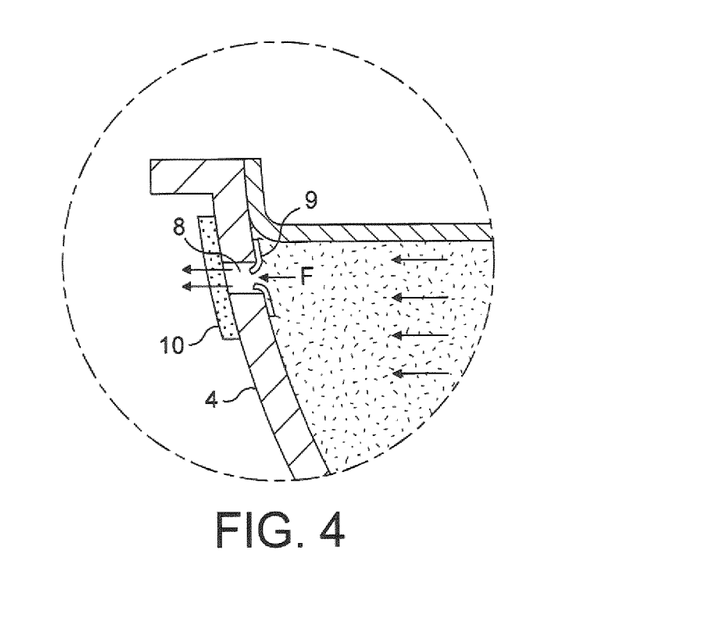
FIG. 4 shows a detail of the capsule of FIG. 2 during beverage extraction.

As illustrated in FIG. 4, when the capsule is rotated around axis "I" in the beverage preparation device, a gradient of pressure of liquid in the capsule is created that progressively increases from the axis "I" (where its value is nil) towards the periphery, more particularly at the breakable areas. The membrane 9 is therefore stretched outwardly by the pressure of liquid acting thereon. Its breaking strength is reached at a certain threshold of pressure of liquid or fluid (considering possible inclusions of gas bubbles in the liquid) causing the release of the resulting beverage through the opening 8 and filter 10.

Figure 5:
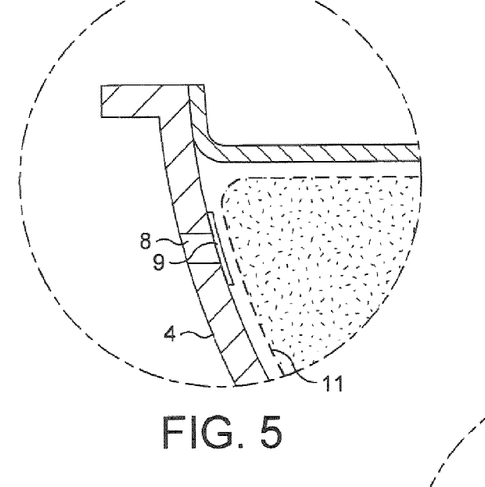
FIG. 5 shows a detail of the capsule of FIG. 2 according to a second embodiment.

FIG. 5 illustrates a variant of the capsule of FIGS. 1 to 4, in which the filter 11 is placed upstream of the membrane 9. For example, the filter is a porous bag containing the beverage ingredients, e.g., ground coffee. The bag may be formed as a torus with a central recess for enabling water injection, or a cup with a lid, or, alternatively, a lentil with two filter sheets sealed together or, alternatively a cubic bag.

In another possible variant (not illustrated), the membrane(s) can be placed on the external surface of the sidewall 4 and the filter can be placed on the internal surface of the sidewall. In another possible variant, the membrane and filter are co-laminated and placed together on the external or internal surfaces of the wall.

Figure 6:
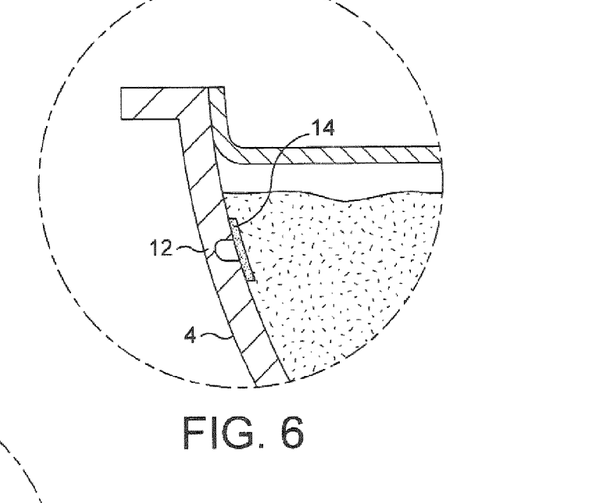
FIG. 6 shows a detail of the capsule of FIG. 2 according to a third embodiment.
Figure 7:
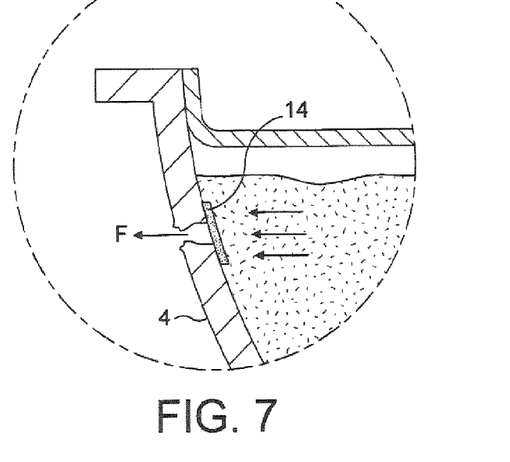
FIG. 7 shows a detail of the capsule of FIG. 6 during extraction.

In a different embodiment of the capsule of the invention illustrated on FIG. 6 or 7, the sidewall 4 has a reduced thickness forming a plurality of weakened points 12 or weakened short lines. The thickness at the points or lines is reduced compared to the thickness of the rest of the sidewall without a necessity for a change of material of the wall itself.

These points or short lines are preferably sized to form small openings when breaking by the effect of the liquid under pressure and additionally by the hot liquid softening the material (FIG. 7). The points or line can be distributed around the circumference of the sidewall. For instance, between 4 to 50 points or lines may be present. Each point of reduced thickness may be, for instance, of a diameter comprised between 0.2 and 2 mm. The lines, if any, may be short (e.g., rectilinear) weakened lines of between 1 and 5 mm long and 0.2 and 1 mm wide. The thickness of the wall around the area may be between 0.5 and 2 mm and the reduction of thickness in the breakable area may be between 30 and 95% of such normal thickness.

The material for the wall can be made of a material chosen amongst: plastic, aluminium, starch-based material and combinations thereof. The material may be a material that softens by contact with a hot liquid such as polyester such as crystallized or semi-crystallized PET (cPET), crystallized or semicrystallized polylactic acid (cPLA) PET (polyethylene terephtalate), PLA (polylactic acid) and combinations thereof.

The structure of points or lines may be obtained by injection-moulding, thermoforming, mechanical stamping, embossing, cutting, laser engraving or chemical etching of the material of the wall itself. The wall may be, as illustrated in this embodiment, the sidewall or, the lid as is described after in relation to the other embodiments.

A filter 14 is also placed to cover the breakable areas 12, i.e., pre-weakened points or lines, either externally or internally.

Figure 8:
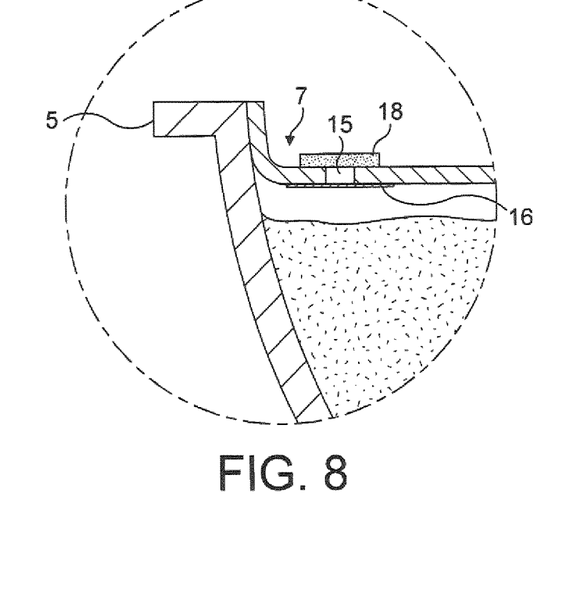
FIG. 8 shows a detail of the capsule according to a fourth embodiment.
Figure 9:
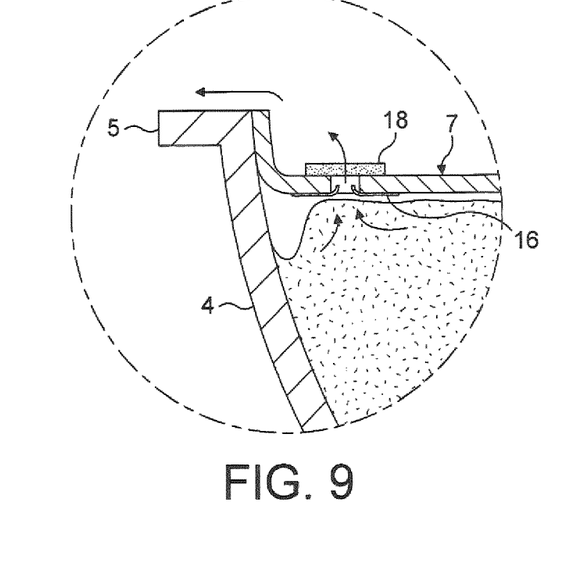
FIG. 9 shows a detail of the capsule of FIG. 8 during beverage extraction.

The embodiment of FIGS. 8 and 9 is a variant of the embodiment of FIGS. 1 to 4. In this new embodiment, the breakable areas are formed on the lid of the capsule by providing through-openings 15 covered by a breakable membrane 16. A filter 18 is also provided such as on the top surface of the lid. The membrane can be placed on the internal surface of the lid 7 as shown or, alternatively, on the external surface of the lid. When the capsule is driven in rotation at relatively elevated speed, the beverage flows upwardly due to the widening shape of the sidewall 4. The membrane 16 breaks and the beverage can flow through the filter 18. It should be noted that the filter 18 could also be formed as a large disc sealed onto the flange 5 of the capsule and covering the lid. In another possible variant, the filter can be an under-layer placed below the lid and sealed at the flange or on the inner surface of the body or on its internal surface. The filter, for example, a piece of foam, may also be placed loosely on the surface of the ingredients without connection to the capsule.

Figure 10:
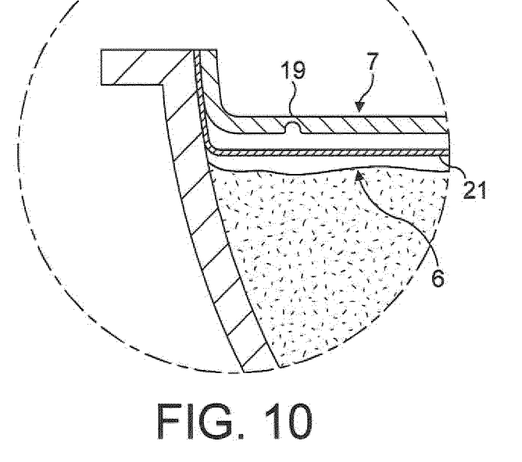
FIG. 10 shows a detail of the capsule according to a fifth embodiment.
Figure 11:
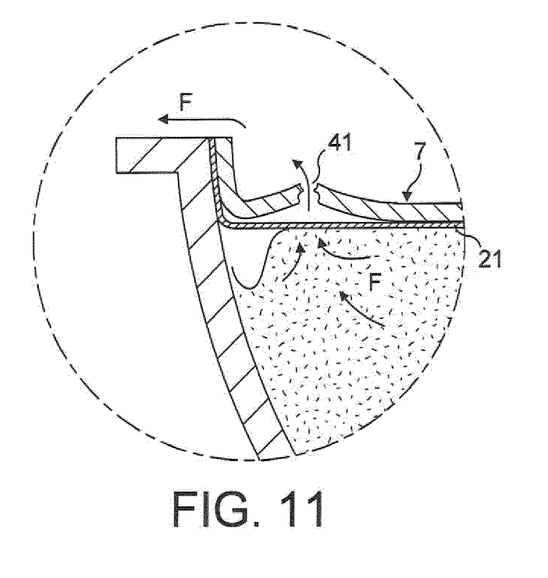
FIG. 11 shows a detail of the capsule of FIG. 10 during beverage extraction.
Figure 12:
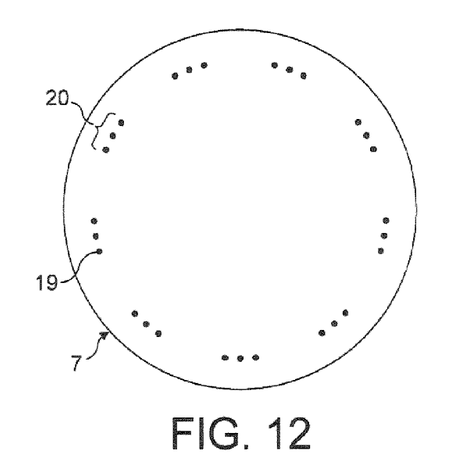
FIG. 12 shows a top view of the capsule of FIGS. 10 and 11.

In the example of FIGS. 10 to 12, the lid 7 comprises small pre-weakened points 19 or short lines provided in the thickness of the material of the lid itself. For instance, the points (or line) may be grouped in a number of points, e.g., three points, sufficiently closed together, to constitute a larger breakable area 20 than the area of each single point (or line). In this case, the opening created by each individual point, when it breaks, expands across several of these points to form a much larger opening. As a result, it is possible to form a smaller pre-weakened structure while providing a sufficiently large opening surface for the beverage flow. It can also be advantageous to have a filter 21 which separates the cavity 6 from the lid 7. The filter may be sealed on the flange of the body.

Figure 13:
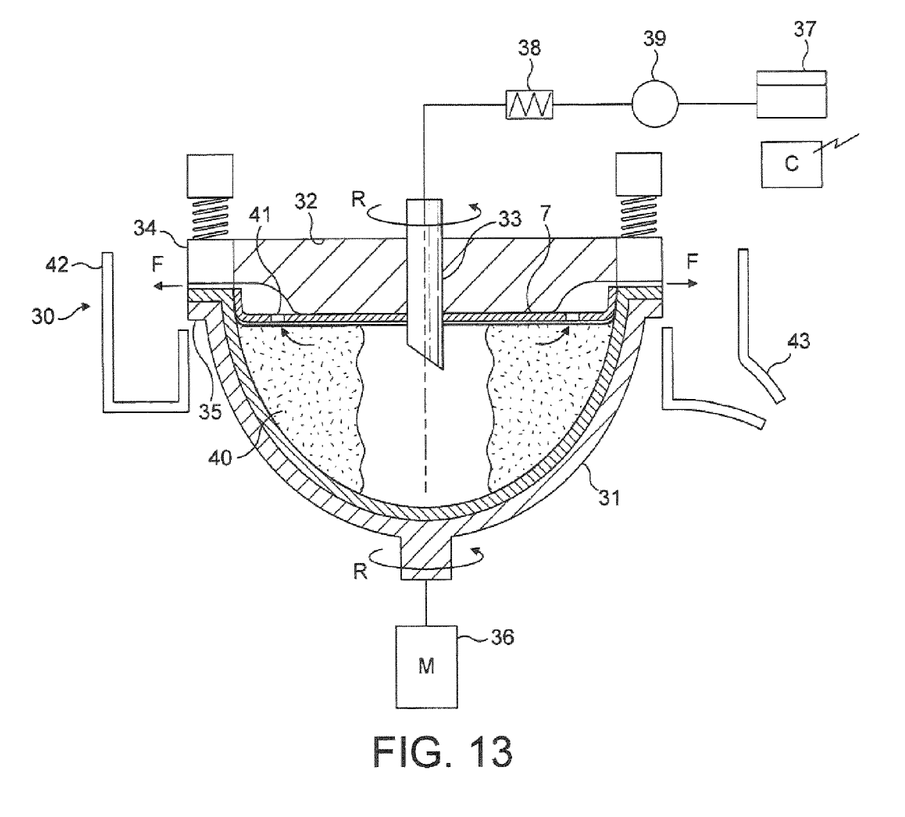
FIG. 13 shows a capsule of the invention during beverage extraction in a beverage preparation device.

FIG. 13 illustrates a beverage preparation system comprising, for example, a capsule as described in FIGS. 10 and 11. The capsule is inserted in the device 30, in particular, in a rotationally mounted capsule holder 31 shaped and dimensioned for properly referencing the body of the capsule. A liquid interfacing member 32 is engaged relatively to the lid 7 of the capsule. As a result, the lid becomes perforated in its centre by a central injector 33. The brewing unit formed by the capsule holder 31 and liquid interfacing member 32, both retain the capsule fixedly. In particular, a peripheral pinching part 34 of the liquid interfacing member 32 engages with the flange of the capsule in a spring-biased manner (as shown) or fixed manner. The flange of the capsule becomes pinched between such pinching part and the support part 35 of the capsule holder. Protrusions and/or channels may further be present at the flange of the capsule to maintain a clearance between the flange of the capsule and the pinching part 34 and/or support part 35. Such clearance can be necessary for the evacuation of the gas during priming (e.g., enabling the filling of the capsule with liquid) and/or for the evacuation of the beverage.

For carrying out the beverage extraction, the brewing unit is driven in rotation at relatively high-speed (e.g., between 500-10000 rpm), by means of a rotary motor 36 linked to the capsule holder 31, and liquid is fed in the capsule through the injector 33. Such liquid may be heated water coming from a reservoir 37 and circulating in a liquid heater 38 (e.g., a thermo-block, cartridge heater or boiler) by means of gravity or pump 39. As the brewing unit, formed by holder 31 and plate 32, is rotated with the capsule inserted therein, the mass 40 of the beverage ingredients is compacted on the inner periphery of the containment walls (sidewall and lid). At a sufficient rotational speed, e.g., comprised within a range of 2500-8000 rpm, the liquid is forced to traverse the resulting compacted mass 40 and to interact with the ingredients so as to form a beverage or liquid extract. The pressure at the pre-weakened areas may reach a value comprised of about 1 to 3 bar. The pressurized liquid forces the pre-weakened areas (points or lines) provided through the lid to break, thereby creating a multitude of openings 41. The breaking principle may be obtained by the hydraulic/mechanical pressure of the liquid acting on the areas or it may be obtained by other principles such as the dissolution of the material constituting the areas with the aqueous medium of the liquid. It may be obtained by the heat of the liquid itself. Finally, a combined effect may be involved such the heat and the pressure of the liquid. The beverage can thus evacuate between the flange 5 and the pinching part 34 of the device. Depending on the configuration of the system, the pinching part 34 may form with the flange a valve means which opens or enlarge only when a certain pressure threshold of liquid is formed on the valve means as described in WO 2008/148646. The beverage is then projected against an impact wall 42 and collected via a beverage duct 43.

In the context of the capsules of FIGS. 1 to 7, the device is configured to allow the beverage to evacuate through passages provided in the capsule holder 31 or between the support part 35 of the capsule holder and the flange 5 of the capsule.

Figure 14:
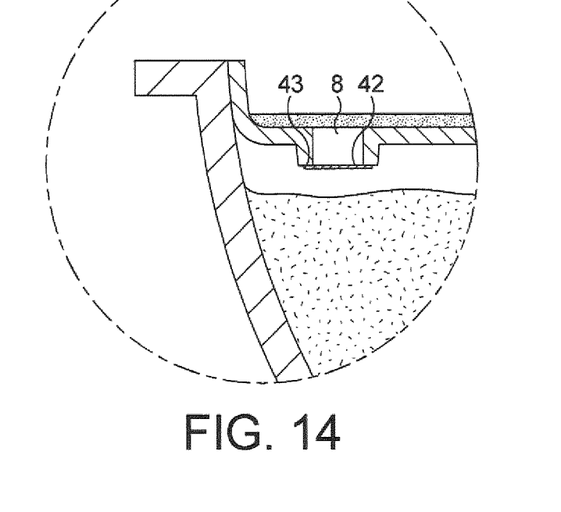
FIG. 14 shows a detail of a capsule according to a sixth embodiment.
Figure 15:
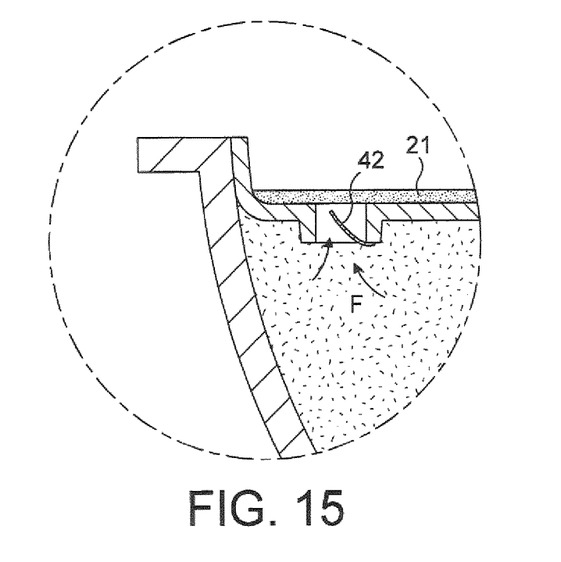
FIG. 15 shows a detail of the capsule of FIG. 14 during beverage extraction.

In the embodiment of FIGS. 14 and 15, the breakable area is formed by an opening 8 covered by a membrane 42 sealed to the lid by a breakable sealing joint 43. The sealing joint 43 can be an adhesive which has a lower tear resistance than the membrane. A filter 21 is provided on the upper surface of the lid. As shown in FIG. 15, when the capsule is rotated, the beverage exerts a pressure on the surface of the membrane forcing the membrane to deflect the membrane 42 up to a point that causes the sealing joint 43 to break or delaminate. Of course, the membrane could also be sealed on the external surface of the lid. The filter may also be placed inside the cavity between the opening 8 or membrane 42 and the ingredients. Of course, the opening of the breakable area can be a combination of delaminating of the sealing joint 43 and breaking of the membrane.

Of course, the principle of a breakable sealing joint for the membrane can be as well applied on the body.

The invention claimed is:
1. A capsule designed for preparing a beverage by centrifugation of a capsule in a centrifugal preparation device, the capsule comprising:
   a body comprising a containment wall defining a main cavity of a central axis;
   an outwardly protruding flange;
   a lid associated with the body for defining a compartment containing beverage ingredients; and
   a plurality of breakable outlet areas positioned at the lid the plurality of breakable outlet areas being positioned at a distance from the central axis and being obtained by a structure selected from the group consisting of a breakable and dedicated membrane covering predefined openings in the lid and connected to the containment wall or the lid, a dedicated membrane covering predefined openings in the lid and connected to the containment wall or the lid by a breakable sealing joint, a dedicated, breakable and localized reduction of thickness of a material of the lid in the plurality of breakable outlet areas, and combinations thereof, and the plurality of breakable outlet areas being positioned at a distance between 0.1 mm and 10 mm from the outwardly protruding flange of the capsule and positioned in the last quarter of a maximal radius of the capsule.

2. The capsule according to claim 1, wherein the plurality of breakable areas are distributed circumferentially at the periphery of the capsule.

3. The capsule according to claim 1, wherein the breakable and dedicated membrane or the dedicated membrane is formed of aluminium and/or polymer(s).

4. The capsule according to claim 3, wherein the breakable and dedicated membrane or the dedicated membrane has a thickness of between 5 and 100 microns.

5. The capsule according to claim 3, wherein the breakable and dedicated membrane or the dedicated membrane has a line of weakness.

6. The capsule according to claim 3, wherein the breakable and dedicated membrane or the dedicated membrane is made of a material that softens, melts or dissolves by contact with a liquid at a temperature between 80 and 100° C.

7. The capsule according to claim 1, wherein the plurality of breakable outlet areas is formed before the outwardly protruding flange of the capsule.

8. The capsule according to claim 1, wherein a filter is associated with the plurality of breakable outlet areas.

9. The capsule according to claim 8, wherein the filter has a position selected from the group consisting of covering the plurality of breakable outlet areas, adjacent the plurality of breakable outlet areas, distanced from the plurality of breakable outlet areas, and combinations thereof.

* * * * *